United States Patent [19]

Gugelyk

[11] Patent Number: 5,197,222
[45] Date of Patent: Mar. 30, 1993

[54] ARTIFICIAL FISH LURE

[76] Inventor: Joseph M. Gugelyk, 15 Hunter Rd., Grimsby, Ontario, Canada, L3M 4A3

[21] Appl. No.: 837,637

[22] Filed: Feb. 13, 1992

[30] Foreign Application Priority Data

Apr. 3, 1991 [CA] Canada ................... 2039689

[51] Int. Cl.⁵ .......................................... A01K 85/00
[52] U.S. Cl. .................................................. 43/42.47
[58] Field of Search ............... 43/42.5, 42.45, 42.47, 43/42.39, 42.32, 42.33, 42.34

[56] References Cited

U.S. PATENT DOCUMENTS

| | | | |
|---|---|---|---|
| 1,963,380 | 6/1934 | Peters et al. | 43/42.5 |
| 2,088,775 | 8/1937 | Davenport | 43/42.5 |
| 2,527,064 | 10/1950 | Hufnagel | 43/42.5 |
| 2,538,703 | 1/1951 | Perry | 43/42.5 |
| 2,569,165 | 9/1951 | Hall | 43/42.47 |
| 2,698,494 | 1/1955 | Larsen | 43/42.5 |
| 3,352,052 | 11/1967 | Woll | 43/42.5 |
| 3,487,576 | 1/1970 | Rustowicz | 43/42.5 |
| 3,497,986 | 3/1970 | Bianco | 43/42.5 |

Primary Examiner—Richard K. Seidel
Assistant Examiner—James Miner
Attorney, Agent, or Firm—Rogers & Scott

[57] ABSTRACT

An artificial under water fish lure, comprising an elongated body, having a cross section of two body plates rising in proportional lengths symmetrically about a line of juncture. The body decreasing in cross sectional size forwardly comprising a head portion, and rearwards. A thin substantially flat head plate affixed on the forward portion of the body. Apertured means at the forward head portion; and whereby when normally drawn horizontally through the water at the end of fish line, the lure will attract fish regularly into striking, by exposing interior and exterior surfaces of the body plates, the majority of the interior surface hidden intermittently by the exterior surface, as the lure wobbles through the water.

10 Claims, 1 Drawing Sheet

ARTIFICIAL FISH LURE

This invention relates to artificial fish lures, and in particular to a fish lure of the underwater action type.

Heretofore many lures of the general type described have been provided wherein water deflecting head plates on bait bodies, have been variously arranged and shaped to cause the bait to descend in the water, when retrieved on the end of fish line, as well as to provide an erratic action. The bait bodies have generally been provided in a variety of textures and finishes, that reflect the colours chosen for the bait body. The reflection of these colours, have a major function in attracting fish into striking the lure.

An object of the present invention is to provide an underwater fish lure, which when retrieved horizontally through the water at the end of fish line, and viewed stationary from a reasonable distance, horizontally and to either side of the lure, will wobble into site and pass out of site, exposing more lure body surfaces to reflect colours, than previous art similar to the same proportional exterior body dimensions of the invention; a major portion of the surface area being displayed in intermittent flashes, as the lure wobbles resembling the flashes of one or more slender bait fish travelling and darting through the water.

Other objects of the invention will be manifest from the following brief description and the accompanying drawings.

OF THE ACCOMPANYING DRAWINGS

Figure 4:
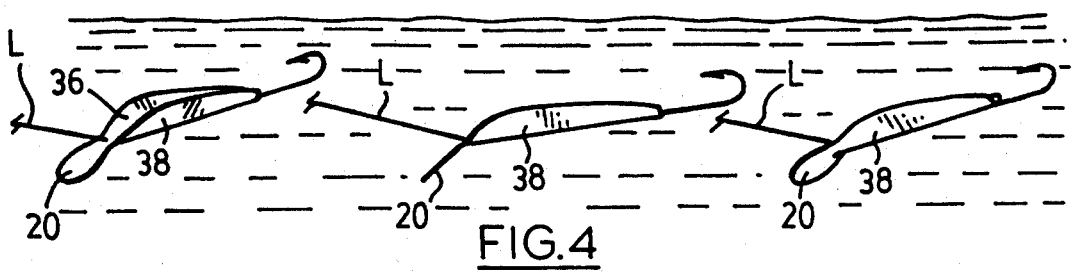
FIG. 4 is a diagrammatic view, on a reduced scale, illustrating the action of the lure in the water.
Figure 1:
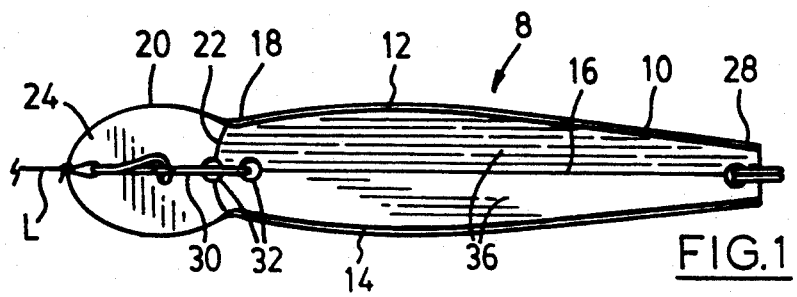
FIG. 1 is a top plan view of an artificial fish lure embodying the features of the invention.
Figure 2:
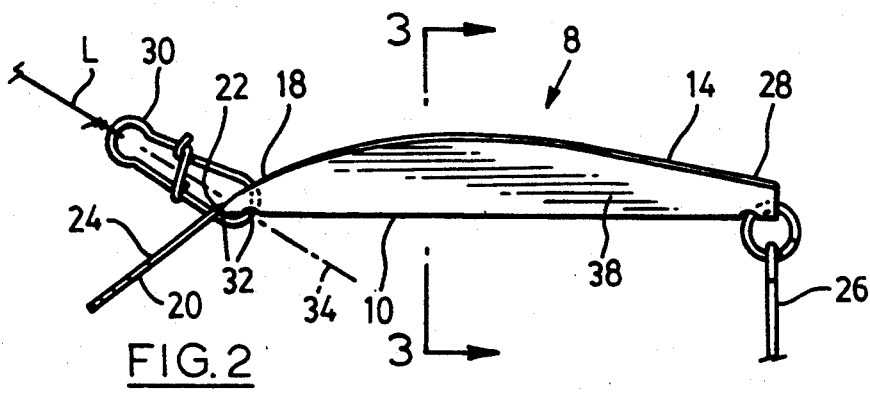
FIG. 2 is a side elevation of the same.
Figure 3:
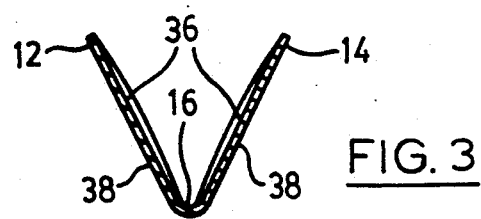
FIG. 3 is a cross sectional view, on an enlarged scale, of the artificial fish lure body, with the fish hook and swivel connection removed for clarity.

Referring particularly to FIGS. 1 to 3, the improved fish lure 8 may include an elongated body 10 having a cross section of two body plates 12 and 14, rising in proportional lengths symmetrically about a line of juncture 16, the body 10 decreasing in cross sectional size forwardly, comprising a forward head portion 18, and rearwards. A thin substantially flat head plate 20 affixed on the front end of the body 10 around a line of juncture 22, thereto project freely forwardly and downwardly of the body 10 as best shown in FIG. 2. The length of the body 10 being more than two and one half times the length of the head plate 20. The top flat surface 24 of head plate 2 lies substantially in a first plane. A fish hook 26 is shown swivelly connected to the tapered rear end 28 of the body 10. A wire line fastener 30 extends through openings 32 in the body 10 at the symmetrical line of juncture 16 of the two body plates 12 and 14, and the head plate 20, swivelly connected beyond the first plane. An imaginary extension 34 of the line L is shown in FIG. 2, intersecting the first plane and the symmetrical line of juncture 16 of the two body plates 12 and 14. Each body plate has an interior surface 36 and an exterior surface 38.

In use of the lure described above for fishing, it is drawn through the water by line L, preferably by trolling behind a boat, but may be cast into the water and retrieved by reeling in line L. Water striking the head plate, and interior and exterior surfaces of the body plates, cause the lure to wobble and descend to a level in the water determined by the degree of water pressure and the length of fish line. The wobbling action moves the body plates from side to side, which appear as a "V" shape in FIG. 3, but may be "U" shaped. Reflective coatings, electro plating, paints, adhesive materials or the like, may be added to the surface of the lure. When viewed horizontally and to either side of the lure, the exterior plate surface 38 hides from view the majority, if not all, of the interior plate surface 36, intermittently, as the lure wobbles. This provides a large area of reflection and intermittent flashes, that resemble the flashes of slender bait fish as they travel and dart through the water.

The lure is preferably made of brass, however the lure may be made of other suitable materials such as aluminum, steels, resiliently flexible plastics, or the like, which may be formed or moulded. A buoyant material or an air gap laminated between materials, would be a modified version of the invention, which would allow the lure to float or submerge slowly in a slack line condition.

Figure 5:
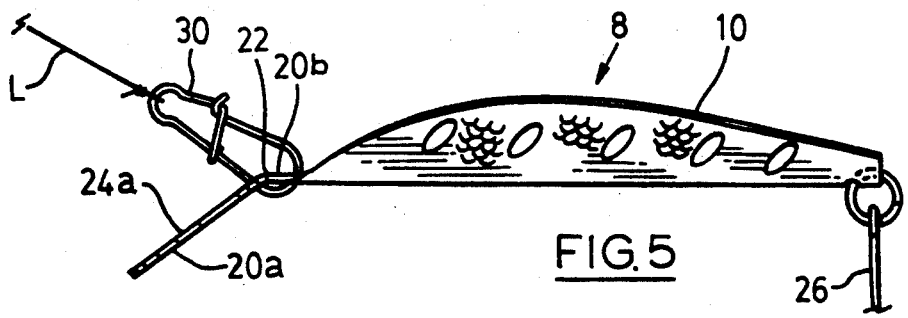
FIG. 5 is a side elevation corresponding to FIG. 2 illustrating modified form of the invention.

FIG. 5 shows a modified form of the invention, which is in all respect the same as the lure 8 described above, except that the head plate 20a is affixed on the front end of the body around a line of juncture 22, extending freely horizontally, before descending freely forwardly and downwardly. The apertured means is shown in the flat horizontal area 20b. The top flat surface 24a of the lower portion of the modified head plate 20a, lies substantially in a first plane. The preferred wobbling action of the lure is still possible in this arrangement, because the wire line fastener is swivelly connected beyond the first plane, and in line with the symmetrical juncture of the two body plates. A scaled finish, and perforations are shown in the body plates for an enhanced look.

Other modifications of the invention may be resorted to without departing from the spirit there of, or the scope of the appended claims.

The embodiments of the invention in which an exclusive property or privilege is claimed are defined as follows:

1. An artificial underwater fish lure comprising an elongated body having front and rear ends and a cross section of two body plates rising in proportional lengths symmetrically about a first line of juncture, the body decreasing in cross sectional size from a medial portion forwardly through a head portion and rearwardly through a rear portion; a thin substantially flat head plate affixed on the front end of the body about a second line of juncture and projecting freely forwardly and downwardly of the body in a first plane; apertured means in the head portion of the body at the first line of juncture of the two body plates and adjacent the head plate; a line-fastening attachment received through the apertured means swivelly connected beyond the first plane and on which the body is adapted to swing; and whereby when the lure is normally drawn horizontally through the water at the end of fish line, water pressure variations against the top side of the head plate, and the interior and exterior portions of the body plates, will cause the lure to wobble from side to side, exposing the interior and exterior surfaces of the body plates, when viewed stationary from a reasonable distance, horizontally and to either side of the lure, the majority of the interior surface being displayed intermittently of the exterior surface.

2. A lure as claimed in claim 1, whereby an imaginary extension of the fish line, intersects the first plane and the first line of juncture of the two body parts, when the lure is drawn horizontally through the water at the end of the line, and viewed from a reasonable distance horizontally and perpendicular to a side profile of the lure.

3. A lure as claimed in claim 2, whereby the apertured means is beyond the first plane, at the first line of juncture of the two body plates.

4. A lure as claimed in claim 1, whereby the body plates are of different thicknesses, from the symmetrical line of juncture, to the distal ends of the body plates in the cross section of the body.

5. A lure as claimed in claim 4, whereby the body plates are laminated.

6. A lure as claimed in claim 5, whereby the body plates are perforated.

7. A lure as claimed in claim 1, whereby the body is equipped with more than one fish hook attached in provided apertured means, along the length of the body at the symmetrical line of juncture of the body plates.

8. A lure as claimed in claim 1, whereby the length of the body is more than two and one half times the length of the head plate.

9. A lure as claimed in claim 1, whereby the greatest cross sectional size of the body, is located in an area from the middle of the body to the forward head portion.

10. An artificial underwater fish lure comprising an elongated body having front and rear ends and a cross section of two body plates rising in proportional lengths symmetrically about a first line of juncture, the body decreasing in cross sectional size from a medial portion forwardly through a head portion and rearwardly through a rear portion; a thin substantially flat head plate affixed on the front end of the body about a second line of juncture, said head plate having a first portion projecting forwardly and horizontally from the head portion of the body and a second portion projecting freely forwardly and downwardly from the first portion in a first plane; apertured means in the horizontal first portion of the head plate aligned with the first line of juncture of the two body plates; a line-fastening attachment received through the apertured means swivelly connected beyond the first plane and on which the body is adapted to swing; and whereby when the lure is normally drawn horizontally through the water at the ed of fish line, water pressure variations against the top side of the inclined second portion of the head plate, and the interior and exterior portions of the body plates, will cause the lure to wobble from side to side, exposing the interior and exterior surfaces of the body plates, when viewed stationary from a reasonable distance, horizontally and to either side of the lure, the majority of the interior surface being displayed intermittently of the exterior surface.

* * * * *